United States Patent
Manabe et al.

(10) Patent No.: US 8,530,105 B2
(45) Date of Patent: Sep. 10, 2013

(54) FUEL CELL SYSTEM

(75) Inventors: Kota Manabe, Toyota (JP); Ayako Kawase, Gamou-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 898 days.

(21) Appl. No.: 12/600,724

(22) PCT Filed: May 28, 2008

(86) PCT No.: PCT/JP2008/060234
§ 371 (c)(1),
(2), (4) Date: Nov. 18, 2009

(87) PCT Pub. No.: WO2008/152950
PCT Pub. Date: Dec. 18, 2008

(65) Prior Publication Data
US 2010/0151341 A1    Jun. 17, 2010

(30) Foreign Application Priority Data
Jun. 14, 2007   (JP) .................................. 2007-157856

(51) Int. Cl.
*H01M 8/18*   (2006.01)

(52) U.S. Cl.
USPC ............................ 429/432; 429/428; 429/430

(58) Field of Classification Search
USPC ................... 429/430, 431, 432, 428
See application file for complete search history.

(56) References Cited

U.S. PATENT DOCUMENTS

2007/0026273 A1*   2/2007   Okamoto ........................ 429/22

FOREIGN PATENT DOCUMENTS

| | | |
|---|---|---|
| EP | 1 008 200 B1 | 9/2003 |
| JP | 2003-504807 A | 2/2003 |
| JP | 2003-086220 A | 3/2003 |
| JP | 2004-349114 A | 12/2004 |
| JP | 2005-050742 A | 2/2005 |
| JP | 2005-322577 A | 11/2005 |
| JP | 2005-339994 A | 12/2005 |
| JP | 2007-048628 A | 2/2007 |
| JP | 2007-141744 A | 6/2007 |

OTHER PUBLICATIONS

Machine Translation of JP 2004-349114, published Dec. 9, 2004.*
Abstract of JP 2004-349114, published Dec. 9, 2004.*

* cited by examiner

*Primary Examiner* — Nicholas P D'Aniello
(74) *Attorney, Agent, or Firm* — Kenyon & Kenyon LLP

(57) ABSTRACT

Provided is a fuel cell system capable of accurately estimating I-V characteristics of a fuel cell. An impedance measurement section measures an impedance of the fuel cell and obtains a voltage drop caused by a direct-current resistance. An air stoichiometry judgment section detects the amount of oxidant gas supplied to the fuel cell and thereby judges whether or not the air stoichiometry ratio is 1 or higher at this time point. An estimated I-V characteristics line creation section determines that the remaining voltage component consists entirely of an activation voltage when the air stoichiometry ratio notified by the air stoichiometry judgment section is 1 or higher, while determining that the remaining voltage drop component includes the combination of the activation overvoltage and voltage drop corresponding to the change in the electromotive voltage when the notified air stoichiometry ratio is below 1.

5 Claims, 15 Drawing Sheets

FUEL CELL SYSTEM

This is a 371 national phase application of PCT/JP2008/060234 filed 28 May 2008, which claims priority to Japanese Patent Application No. 2007-157856 filed 14 Jun. 2007, the contents of which are incorporated herein by reference.

FIELD OF THE INVENTION

The present invention relates to a fuel cell system, and particularly to a fuel cell system which controls output power in accordance with the operation state of a fuel cell.

BACKGROUND OF THE INVENTION

In this day and age when there is concern regarding the dependence on oil by a future motorized society, people are expecting that automobiles equipped with fuel cells, which use hydrogen as a fuel, will become popular. A fuel cell has a stack structure in which cells are stacked in series, and generates electrical power utilizing an electrochemical reaction between a fuel gas containing hydrogen and supplied to an anode and an oxidant gas containing oxygen and supplied to a cathode.

Fuel cells have various constraints in starting as compared to other types of power sources. The power generation efficiency of a fuel cell decreases due to a decrease in temperature or poisoning of an electrode catalyst, and therefore may become unable to supply a desired voltage/current and even unable to start equipment.

In light of such circumstances, an operation has been performed in which a fuel cell is started with a short supply of at least one of the fuel gas supplied to the anode and the oxidant gas supplied to the cathode, so that overvoltage in a part of the electrodes will increase and more heat will be generated, and thereby increasing the temperature of the fuel cell and restoring the electrode catalyst from poisoning, etc (hereinafter referred to as refresh operation) (see, for example, Patent Document 1 below).

Patent Document 1: JP2003-504807 T

DISCLOSURE OF THE INVENTION

The I-V characteristics of a fuel cell are not constant but greatly vary depending on the operation status of the fuel cell (whether the fuel cell is in a normal operation state or in a refresh operation state), an operation environment (e.g., outside-air temperature), etc. If the output power of the fuel cell is controlled without taking such variation into account, problems such as overcharging of a secondary battery might arise.

In this regard, JP 20005-50742 A, etc. discloses a technique for estimating the I-V characteristics of a fuel cell and controlling the output power of the fuel cell based on the estimated I-V characteristics. However, this technique is not aimed at estimating a voltage drop in the output voltage of the fuel cell for each factor, and therefore there is a problem with this technique's insufficient accuracy of the estimation of the I-V characteristics.

The present invention has been made in light of the above circumstances, and an object of the present invention is to provide a fuel cell system capable of accurately estimating the I-V characteristics of a fuel cell.

In order to achieve the above object, a fuel cell system according to an aspect of the present invention includes: a fuel cell; a first detection unit that detects an output current and an output voltage at an actual operating point in the fuel cell; a second detection unit that detects an amount of voltage reduction caused by a resistance in the fuel cell; a third detection unit that detects an amount of voltage reduction caused by a polarization in the fuel cell; a fourth detection unit that detects an amount of reduction in an electromotive voltage of the fuel cell; and an estimation unit that estimates current-voltage characteristics of the fuel cell based on a detection result by each of the detection units.

With such a configuration, the voltage drop generated as a result of the operation is categorized into the following three types: a voltage drop caused by a polarization and not proportional to a current; a voltage drop caused by a resistance and proportional to a current; and a voltage drop corresponding to a change in an electromotive voltage, and the I-V characteristics (current-voltage characteristics) of the fuel cell are estimated based on these types. As a result, the I-V characteristics of the fuel cell can be accurately estimated as compared to the related art, and consequently a divergence between actual I-V characteristics and the estimated I-V characteristics line of the fuel cell can be minimized.

In the configuration above, it is preferable that the second detection unit measures an impedance of the fuel cell and detects the amount of voltage reduction caused by the resistance based on the measurement result of the impedance and the output current Also, in the configuration above, it is preferable that the fuel cell system further includes: a stoichiometry ratio detection unit that detects a stoichiometry ratio of an oxidant gas supplied to the fuel cell; and a judgment unit that judges whether an amount of voltage reduction, excluding the amount of voltage reduction caused by the resistance from the difference between the electromotive voltage of the fuel cell and the output voltage at the actual operating point, consists entirely of the amount of voltage reduction caused by the polarization or includes the combination of the amount of voltage reduction caused by the polarization and the amount of reduction in the electromotive voltage, based on the detected stoichiometry ratio of the oxidant gas.

Further, in the configuration above, it is preferable that: the voltage reduction caused by the polarization includes an activation overvoltage; and the fuel cell system further comprises a correction unit that detects, for each predetermined current area, a voltage deviation generated between the current-voltage characteristics of the fuel cell estimated by the estimation unit and the output voltage at the actual operating point detected by the first detection unit, and corrects at least the activation overvoltage based on the detected voltage deviation.

Further, in the configuration above, it is preferable that assuming that a current area in which the correction has been performed from when the system was started until the present moment is referred to as a corrected current area, while a current area in which the correction has not been performed yet is referred to as an uncorrected current area, the correction unit corrects the activation overvoltage in the uncorrected current area using a correction amount for the activation overvoltage in the corrected current area.

Further, in the configuration above, it is preferable that the estimation unit estimates different current-voltage characteristics depending on directions of variation of the output current of the fuel cell; and the correction unit corrects the activation overvoltage using the current-voltage characteristics corresponding to the directions of variation.

Further, in the configuration above, it is preferable that the fuel cell system further includes a judgment unit that judges whether or not a catalyst in the fuel cell has been degraded by comparing the amount of voltage reduction caused by the polarization and detected by the third detection unit with a set amount of reduction in the electromotive voltage.

As described above, the present invention enables the I-V characteristics of the fuel cell to be estimated accurately.

BEST MODE FOR CARRYING OUT THE INVENTION

An Embodiment of the present invention will be described below with reference to the attached drawings.

A. Embodiment

A-1. Configuration

Figure 1:
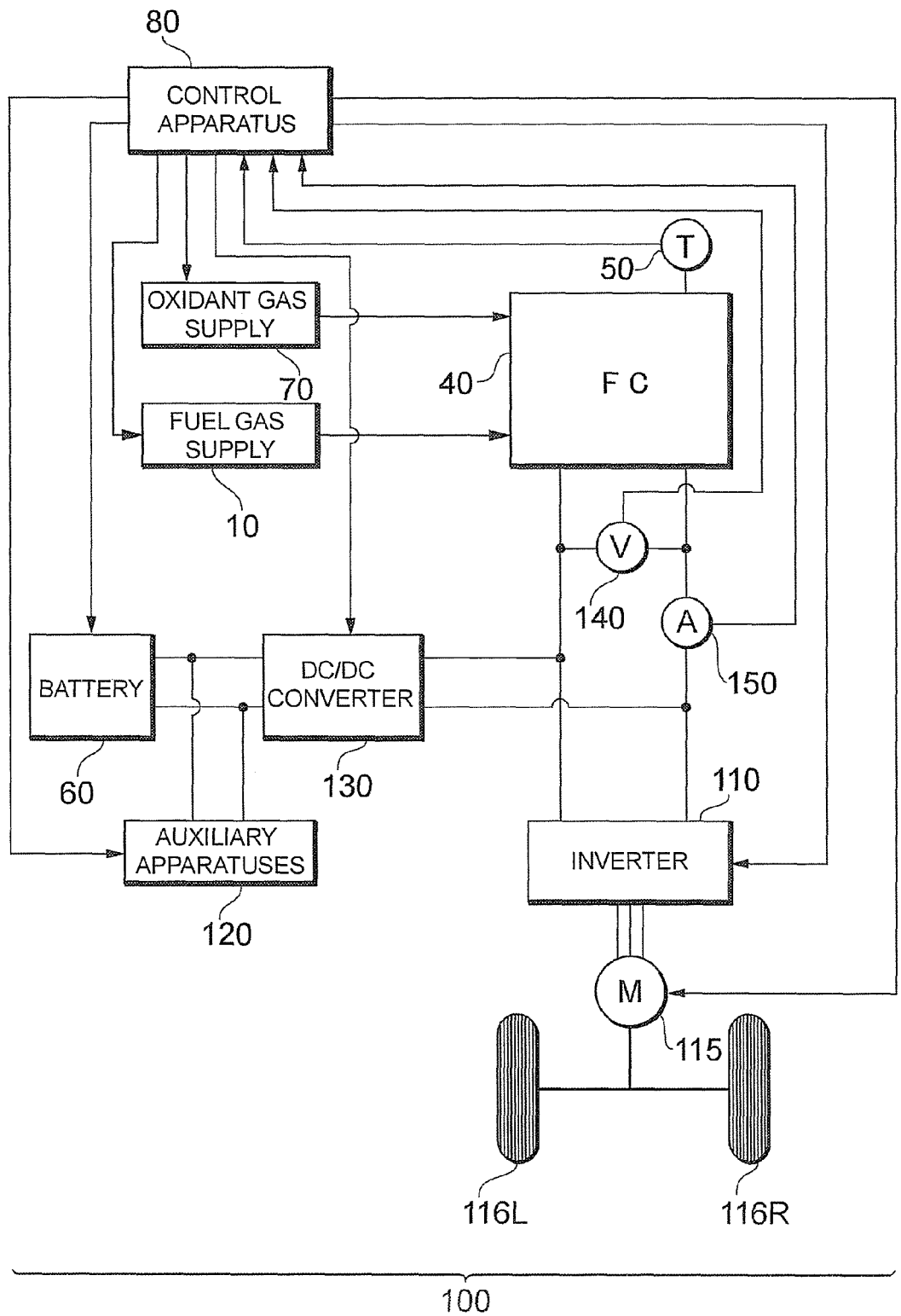
FIG. 1 is a diagram showing the primary configuration of a fuel cell system according to an embodiment.

FIG. 1 shows a schematic configuration of a vehicle equipped with a fuel cell system 100 according to an embodiment. Note that, although the following description assumes a fuel cell hybrid vehicle (FCHV) as an example of vehicles, the fuel cell system may also be applied to electric vehicles and hybrid vehicles. In addition, the fuel cell system may be applied not only to the vehicles but also to various mobile objects (e.g., ships, airplanes and robots), stationary power supplies and mobile fuel cell systems.

A fuel cell 40 is a means for generating electrical power from supplied reaction gases (fuel gas and oxidant gas), and various types of fuel cells such as polymer electrolyte fuel cells, phosphoric acid fuel cells and molten carbonate fuel cells may be used. The fuel cell 40 has a stack structure in which plural unit cells, each including an MEA, etc., are stacked in series. An output voltage (hereinafter referred to as an "FC voltage") and an output current (hereinafter referred to as an "FC current") at an actual operating point of the fuel cell 40 are detected respectively by a voltage sensor (first detection unit) 140 and a current sensor (first detection unit) 150. A fuel gas such as a hydrogen gas is supplied from a fuel gas supply 10 to a fuel electrode (anode) in the fuel cell 40, while an oxidant gas such as the air is supplied from an oxidant gas supply 70 to an air electrode (cathode).

The fuel gas supply 10 is constituted from, for example, a hydrogen tank and various types of valves, and controls the amount of the fuel gas to be supplied to the fuel cell 40 by adjusting the degree of opening of the valves or the on/off times.

The oxidant gas supply 70 is constituted from, for example, an air compressor, a motor for driving the air compressor and an inverter, and adjusts the amount of oxidant gas to be supplied to the fuel cell 40 by adjusting the number of rotations of the motor, etc.

A battery 60 is a dischargeable/chargeable secondary battery, which is constituted from, for example, a nickel hydrogen battery. Obviously, a dischargeable/chargeable power storage device (e.g., a capacitor) other than the secondary battery may be used instead of the battery 60. The battery 60 and the fuel cell 40 are connected, in parallel, to an inverter 110 for a traction motor, and a DC/DC converter 130 is provided between the battery 60 and the inverter 110.

The inverter 110 is, for example, a pulse width modulation-type (PWM) inverter, which converts direct-current power output from the fuel cell 40 or battery 60 to three-phase alternating current power in accordance with a control command provided by a control apparatus 80 and then supplies the converted power to a traction motor 115. The traction motor 115 is a motor for driving wheels 116L and 116R, and the number of rotations of the motor is controlled by the inverter 110.

The DC/DC converter 130 is a full-bridge converter which includes, for example, four power transistors and a dedicated drive circuit (each not shown). The DC/DC converter 130 has: the function of increasing or decreasing the DC voltage input from the battery 60 and then outputting the DC voltage toward the fuel cell 40; and the function of increasing and decreasing a DC voltage input from the fuel cell 40, etc., and then outputting the DC voltage toward the battery 60. These functions of the DC/DC converter 130 charge and discharge the battery 60.

Provided between the battery 60 and DC/DC converter 130 are auxiliary apparatuses 120 such as a vehicle auxiliary apparatus and an FC auxiliary apparatus. The battery 60 serves as a power source of these auxiliary apparatuses 120. Note that the vehicle auxiliary apparatus refers to various types of electrical equipment used during the operation of the vehicle (e.g., lighting equipment, air conditioner and hydraulic pump), while the FC auxiliary apparatus refers to various types of electrical equipment used for the operation of the fuel cell 40 (e.g., pumps for supplying the fuel gas and oxidant gas).

The control apparatus 80 is constituted from a CPU, a RAM, a ROM, etc., and centrally controls each section of the system based on sensor signals input from the voltage sensor 140 for detecting the FC voltage, the current sensor 150 for detecting the FC current, a temperature sensor 50 for detecting the temperature of the fuel cell 40, an SOC sensor for detecting the state of charge of the battery 60, an accelerator pedal sensor for detecting the degree of opening of an accelerator pedal, etc. Also, the control apparatus 80 makes I-V characteristics estimation with higher accuracy compared to the related art by estimating a voltage drop in the fuel cell 40 with respect to each factor.

Process for Estimating I-V Characteristics

Figure 2:
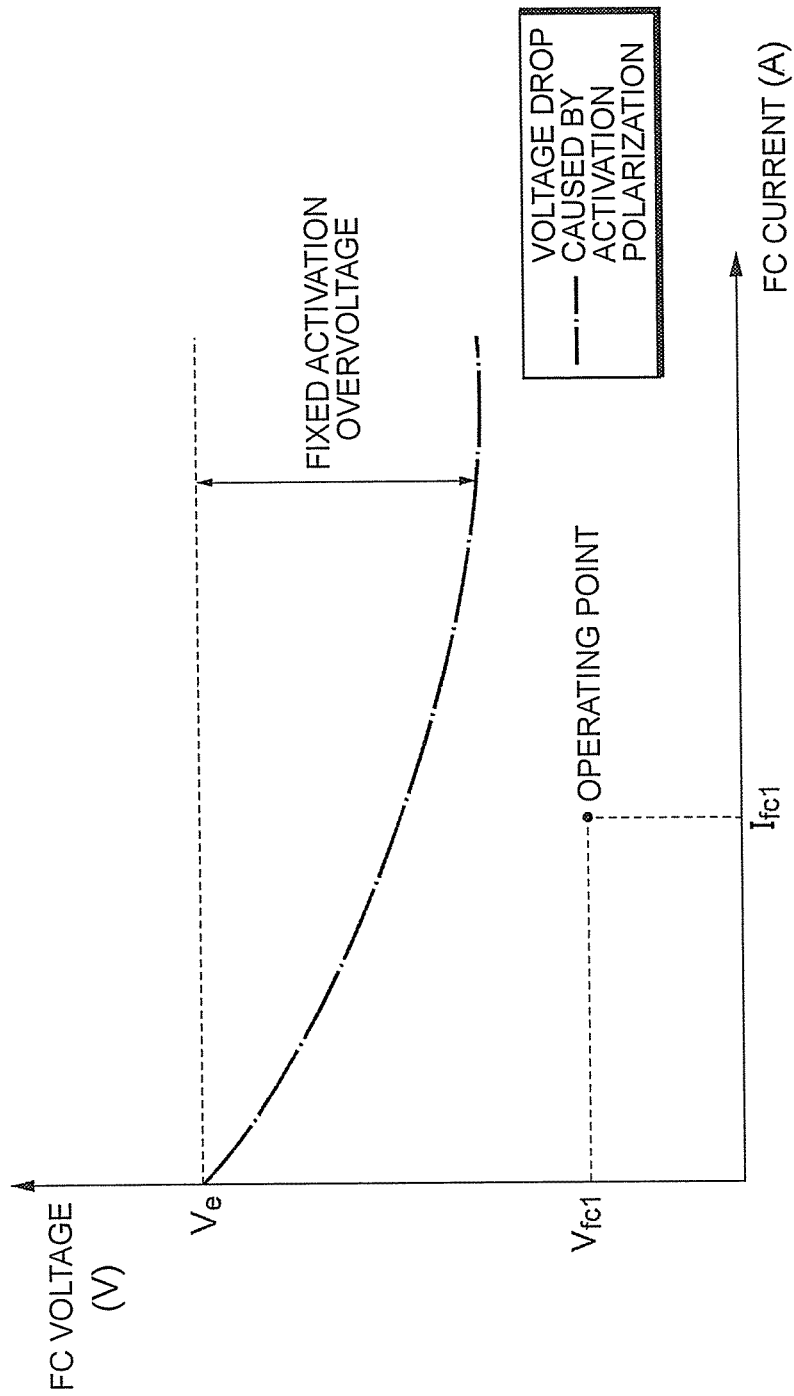
FIG. 2 is a diagram explaining a process of estimating I-V characteristics in the related art.
Figure 3:
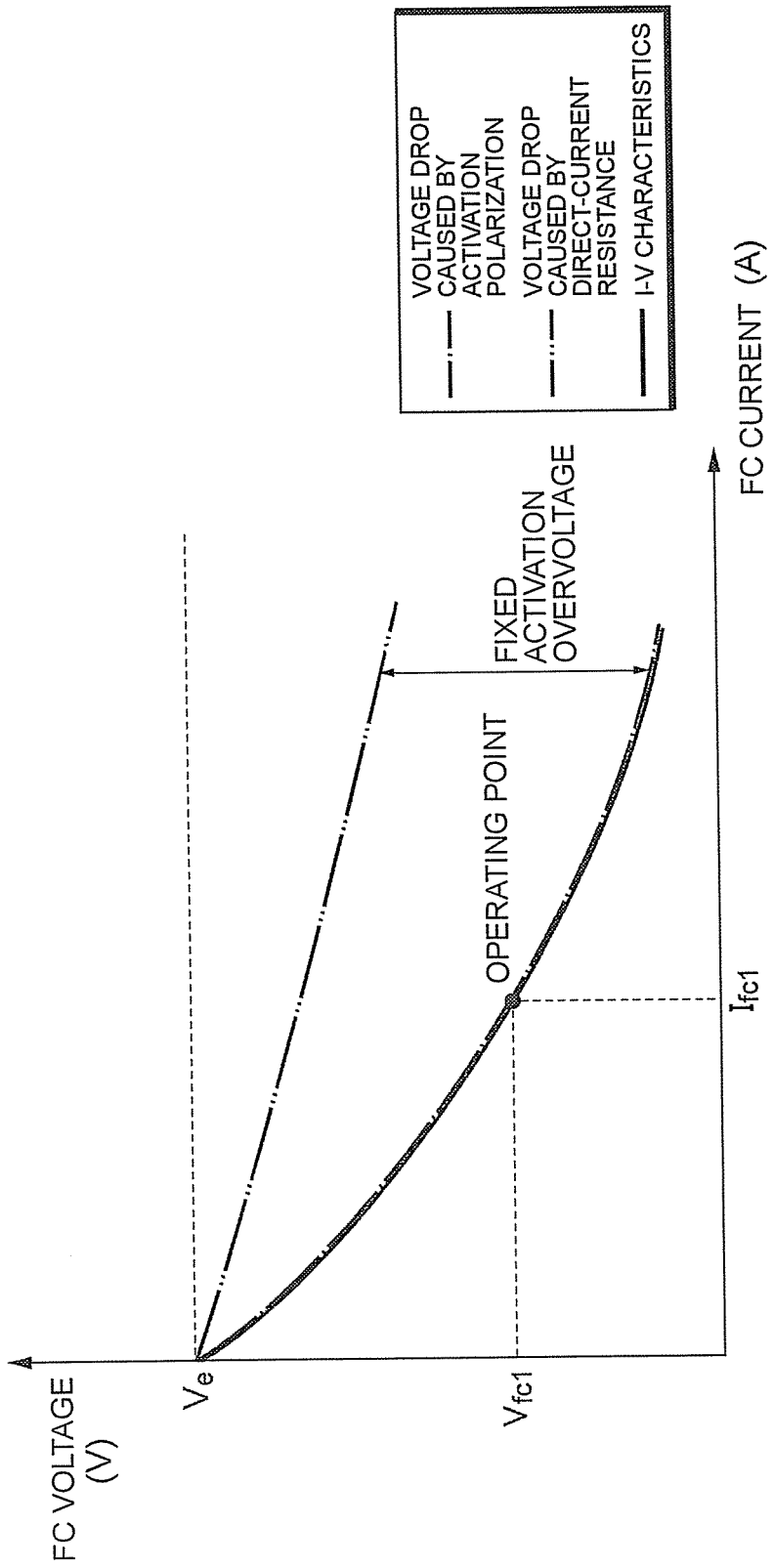
FIG. 3 is a diagram explaining the process of estimating I-V characteristics in the related art.

FIGS. 2 and 3 are diagrams explaining a process of estimating I-V characteristics in the related art. FIGS. 2 and 3 show information used for estimating I-V characteristics, where the alternate long and short dash line shows an estimated line for a voltage drop caused by activation polarization (activation overvoltage), the solid line shows an estimated I-V characteristics line, and the alternate long and two short dashes line shows an estimated line for a voltage drop caused by a direct-current resistance. Note that the vertical axis and horizontal axis in FIGS. 2 and 3 show an FC voltage and an FC current, respectively, and the intercept of the vertical axis shows an electromotive force (electromotive voltage) Ve.

As shown in FIG. 2, in a fuel cell system in the related art, the electromotive force Ve of a fuel cell and the activation overvoltage were represented as fixed values. Thus, when an FC voltage and an FC current were detected by a voltage sensor and a current sensor and an actual operating point (Ifc1, Vfc1) of the fuel cell was obtained, all of the difference between the FC voltage at the actual operating point and the activation overvoltage has been determined as being a voltage drop caused by the direct-current resistance (see FIG. 3).

However, if all of the difference between the FC voltage at the actual operating point and the activation overvoltage is determined as being the voltage drop caused by the direct-current resistance as described above and the estimated value of the voltage drop caused by the direct-current resistance is shifted using a time constant, a large divergence will occur between the estimated I-V characteristics line and the actual operating point.

In light of the circumstances above, the inventors of the present invention devoted themselves to studying this divergence and determined factors of the divergence as follows. More specifically, the inventors have determined the following points as the primary factors of the divergence—the electromotive voltage Ve of a fuel cell has been treated as being constant even though it varies depending on the operation state (normal operation or refresh operation), and the activation overvoltage has been treated as being constant even though it varies due to influences such as degradation over time and temperature.

Figure 4:
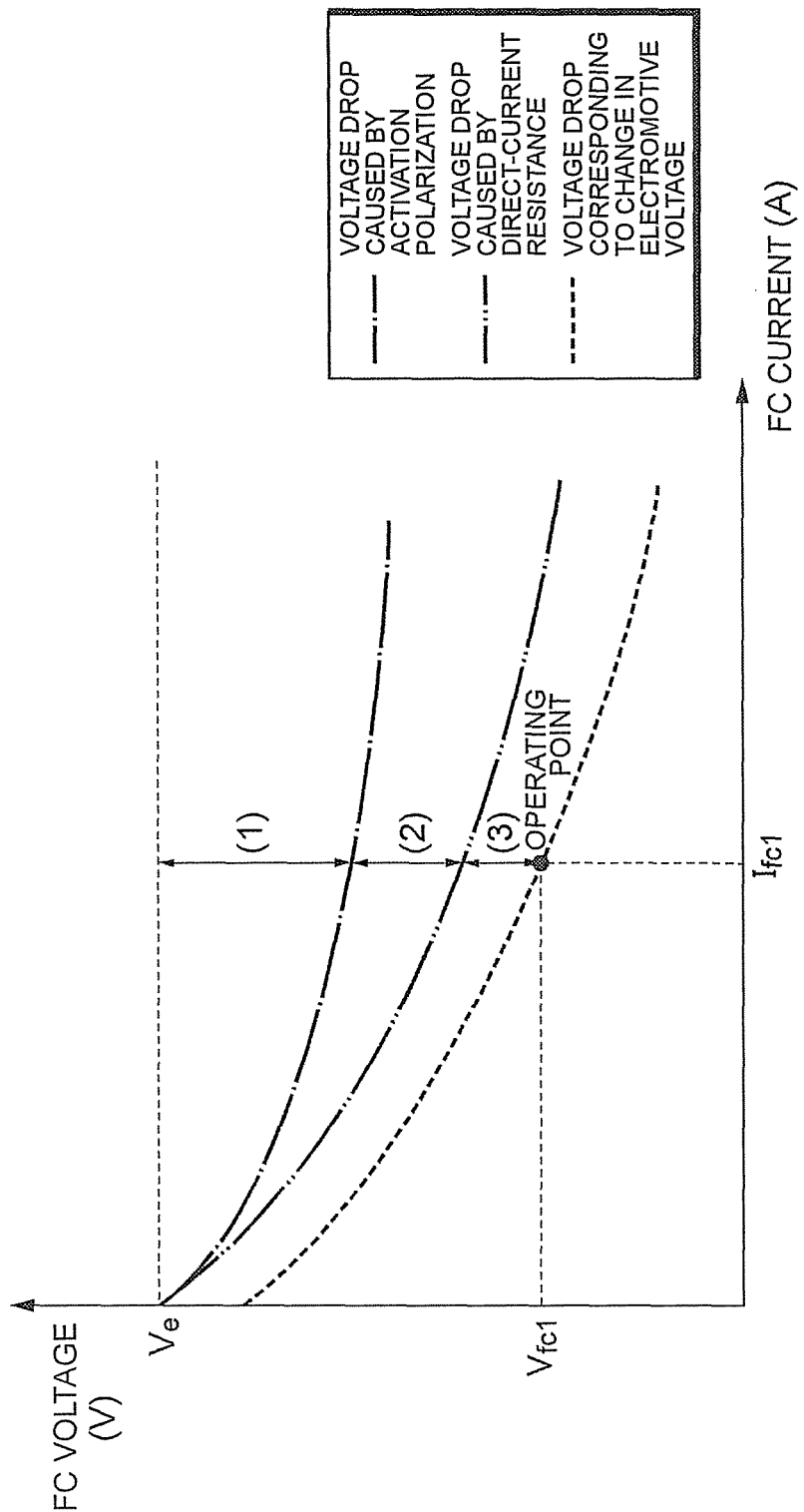
FIG. 4 is a diagram explaining each voltage drop generated as a result of an operation.

In consideration of the above, in this embodiment, the voltage drop which occurs as a result of the operation are categorized into three types: (1) voltage drop caused by polarization and not proportional to the current; (2) voltage drop proportional to the current (voltage drop caused by the direct-current resistance); and (3) voltage drop corresponding to a change in the electromotive voltage, and the I-V characteristics of the fuel cell are estimated based on these types of voltage drops (see FIG. 4). In FIG. 4, the voltage drop corresponding to the change in the electromotive voltage is shown by the thick dashed line. Note that, in this embodiment, the voltage drop caused by the polarization refers to a voltage drop caused by activation polarization and concentration polarization. However, for the convenience of explanation, the following description assumes activation overvoltage (a voltage drop caused by activation polarization) as the voltage drop that is caused by the polarization and not proportional to the current.

Countermeasure

First, regarding the voltage drop caused by the direct-current resistance mentioned in (2) above, the alternating-current impedance of the fuel cell 40 is intermittently or continuously measured during the operation of the system to generate an estimated direct-current resistance value, and the voltage drop caused by the direct-current resistance is estimated using this estimated direct-current resistance value.

Figure 5:
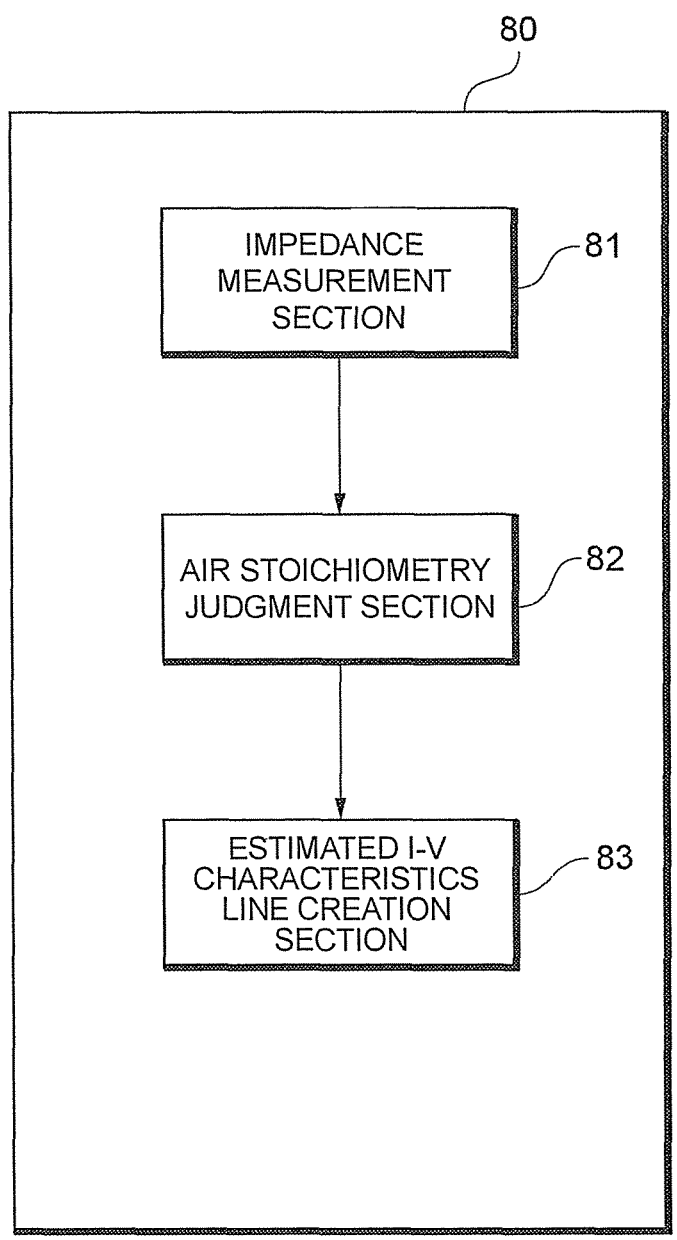
FIG. 5 is a functional block diagram related to an I-V characteristics estimation function.

FIG. 5 is a functional block diagram related to an I-V characteristics estimation function of the control apparatus 80.

Figure 6:
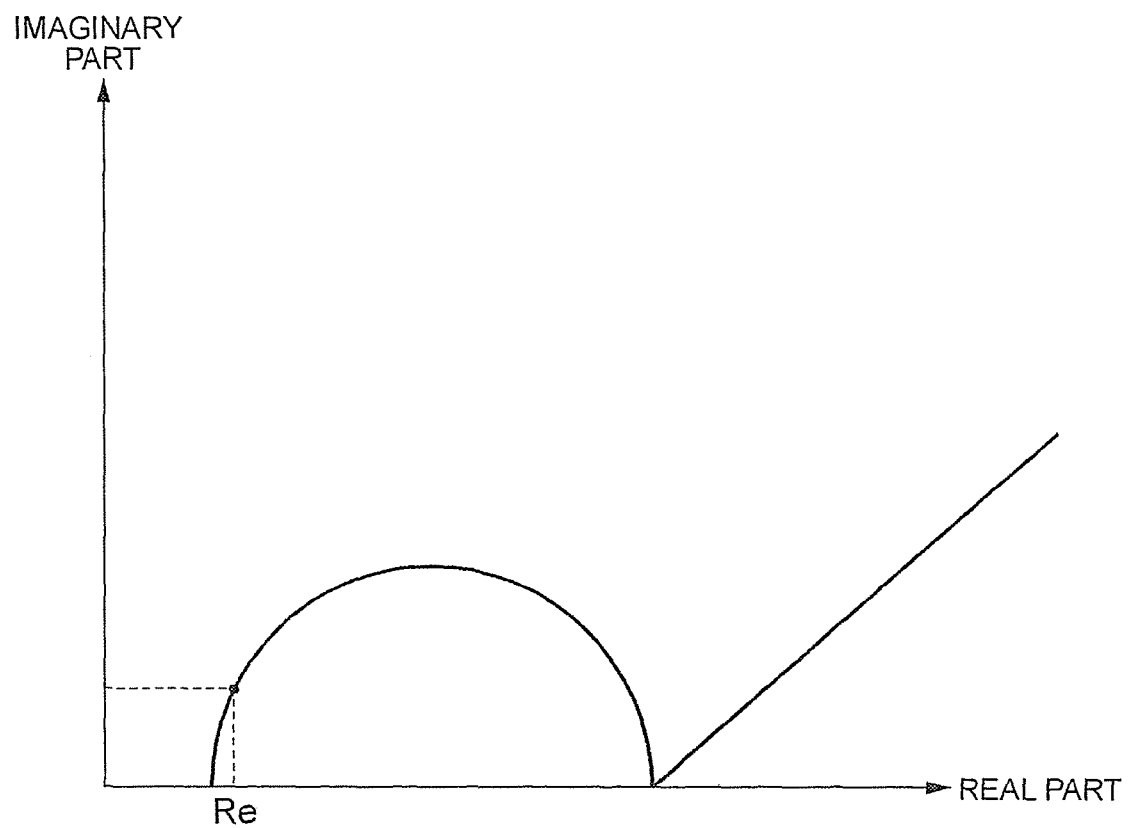
FIG. 6 is a diagram showing an example of an impedance curve.

The control apparatus 80 includes an impedance measurement section 81, an air stoichiometry judgment section 82, and an estimated I-V characteristics line creation section 83. FIG. 6 is a diagram schematically showing, on a complex plane, the result of an impedance measurement using an alternating-current impedance method, where the vertical axis shows an imaginary part, while the horizontal axis shows a real part.

When the impedance of the fuel cell 40 is measured under a predetermined condition and the trajectory of the impedance along with a frequency change is plotted on the complex plane (Cole-Cole plot), the impedance curve shown in FIG. 6 can be obtained. In this embodiment, the impedance measurement section (second detection unit) 81 of the control apparatus 80 intermittently or continuously measures the impedance of the fuel cell 40 during the operation of the system. The impedance measurement section 81 then employs the real part of the impedance which has been measured (measured impedance) as an estimated direct-current resistance value Re, multiplies the estimated direct-current resistance value Re by the FC current detected by the current sensor 150, and thereby determines the voltage drop caused by the direct-current resistance (see FIG. 6). The impedance measurement section 81 notifies the air stoichiometry judgment section 82 in the control apparatus 80 of the thus-determined voltage drop caused by the direct-current resistance.

Upon the reception of the notification containing the voltage drop caused by the direct-current resistance, the air stoichiometry judgment section (stoichiometry ratio detection unit) 82 judges whether or not the air stoichiometry ratio at the present moment is 1 or higher by detecting the amount of the oxidant gas supplied to the fuel cell 40 (the amount of gas supplied per unit time), and then notifies the estimated I-V characteristics line creation section 83 in the control apparatus 80 of the judgment result. Here, the air stoichiometry ratio is used to identify the operation state of the fuel cell 40, where the air stoichiometry judgment section 82 determines that the operation state is the normal operation state when the air stoichiometry ratio has been set to 1 or higher, while the air stoichiometry judgment section 82 determines that the operation state is the refresh operation state when the air stoichiometry ratio has been set to below 1.

The estimated I-V characteristics line creation section (judgment unit, estimation unit) 83, for example, determines a voltage drop component excluding the voltage drop caused by the direct-current resistance (hereinafter referred to as the "remaining voltage drop component"), based on the air stoichiometry ratio notified by the air stoichiometry judgment section 82.

Figure 7:
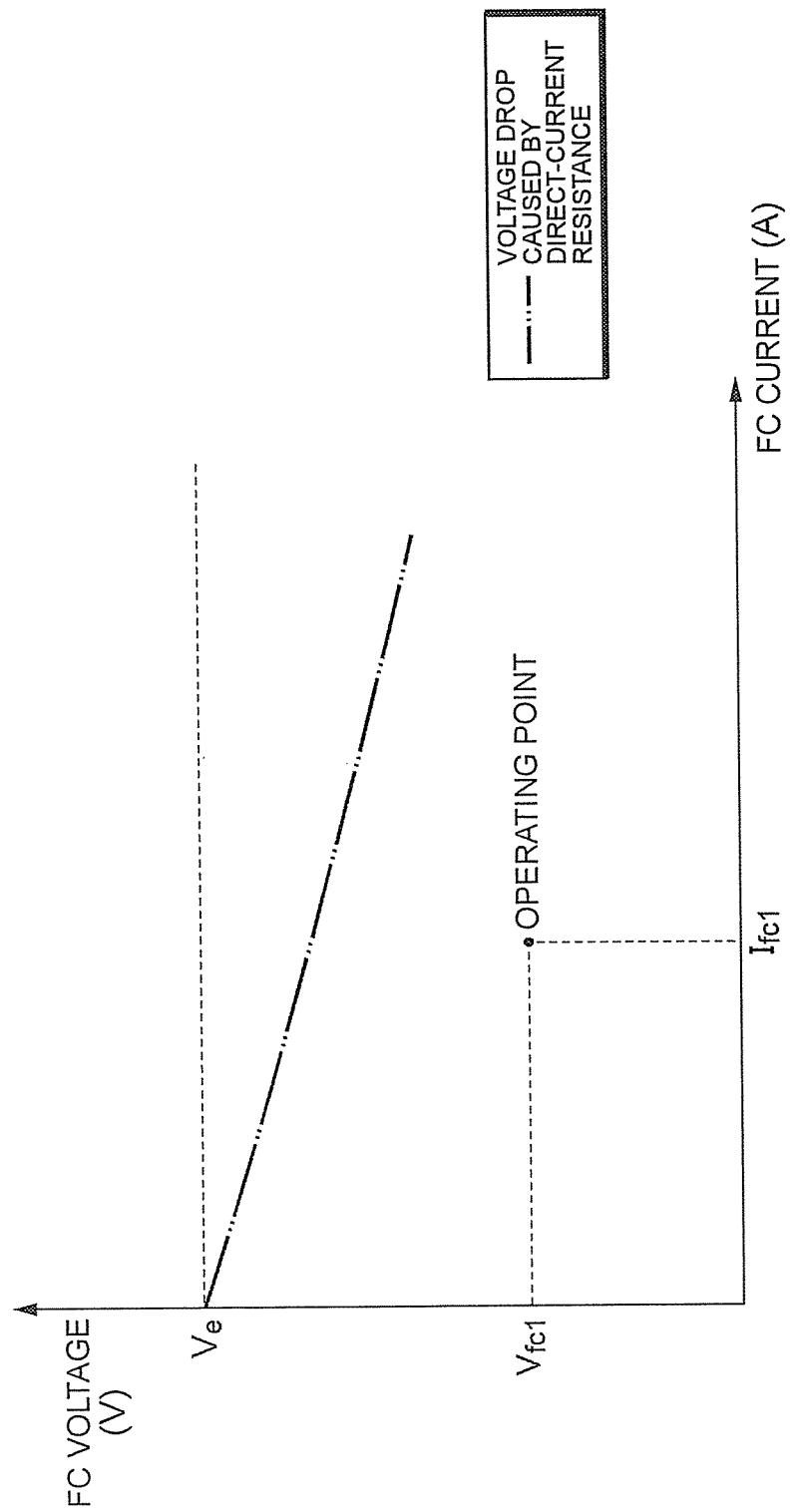
FIG. 7 is a diagram explaining a process of deriving a voltage drop caused by a direct-current resistance.
Figure 8:
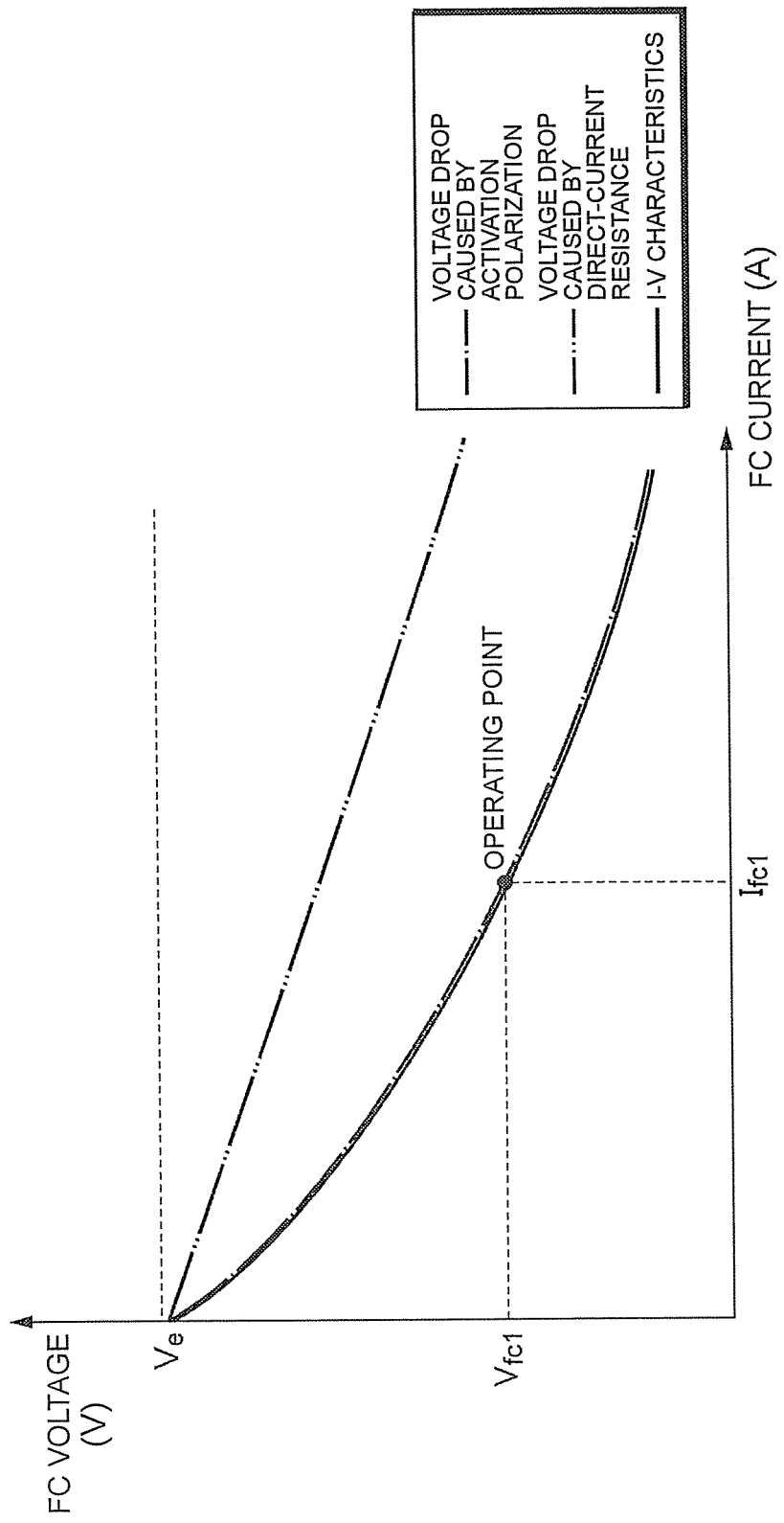
FIG. 8 is a diagram explaining a process of generating an estimated I-V characteristics line when an air stoichiometry ratio is 1 or higher.

First, the estimated I-V characteristics line creation section 83 obtains an actual operating point (Ifc1, Vfc1) of the fuel cell 40 at the present moment (see FIG. 7). The estimated I-V characteristics line creation section 83 refers to the air stoichiometry ratio notified by the air stoichiometry judgment section 82 and judges whether or not the air stoichiometry ratio is 1 or higher. If the notified air stoichiometry ratio is 1 or higher, the estimated I-V characteristics line creation section (third detection unit) 83 determines that the remaining voltage component entirely consists of the activation voltages, and creates the estimated I-V characteristics line as shown in FIG. 8. In FIG. 8, the solid line shows the estimated I-V characteristics line, the alternate long and short dash line shows an estimated line of activation overvoltage, and the alternate long and two short dashes line shows an estimated line of a voltage drop caused by the direct-current resistance.

Figure 9:
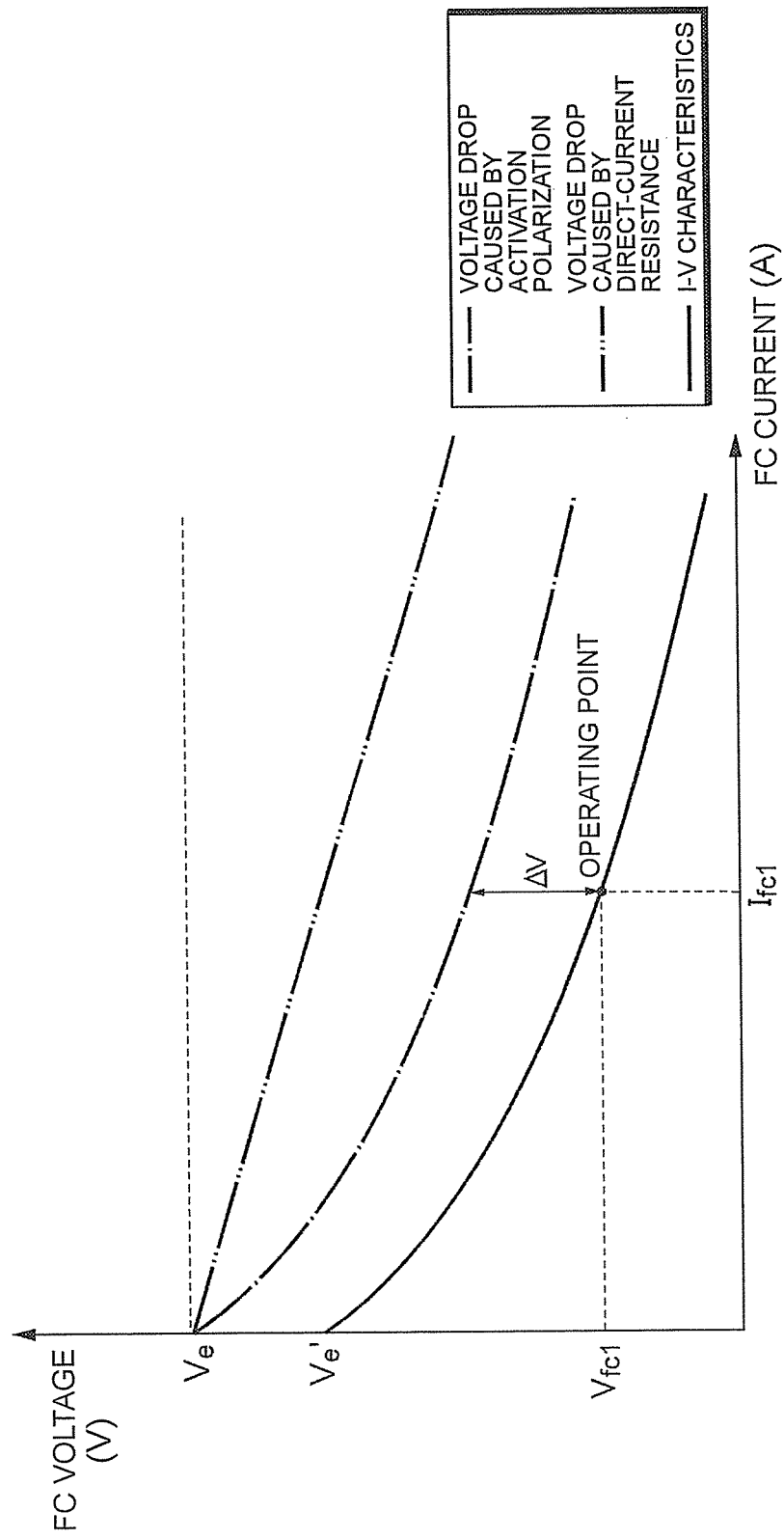
FIG. 9 is a diagram explaining a process of generating an estimated I-V characteristics line when an air stoichiometry ratio is below 1.
Figure 10:
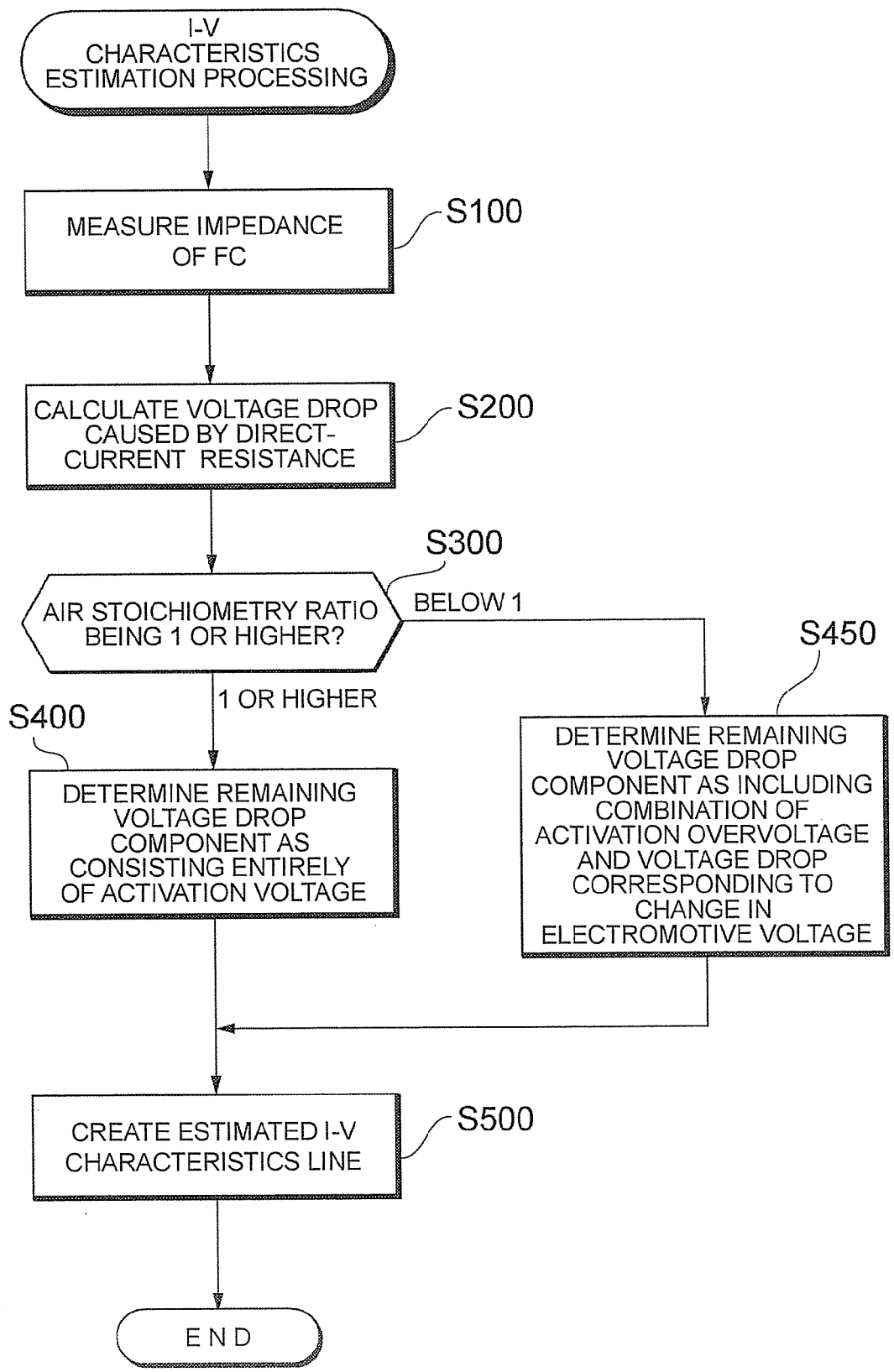
FIG. 10 is a flowchart showing I-V characteristics estimation processing.

On the other hand, if the notified air stoichiometry ratio is below 1, the estimated I-V characteristics line creation section 83 determines that the remaining voltage drop component includes the combination of the activation overvoltage and the voltage drop corresponding to the change in the electromotive voltage (see FIG. 9). Here, when an estimated line of the activation overvoltage has already been created as described above (see FIG. 8), the estimated I-V characteristics line creation section (third detection unit) 83 utilizes the created estimated line of the activation overvoltage, while when an estimated line of the activation overvoltage has not been created yet, the estimated I-V characteristics line creation section 83 utilizes an estimated line of the activation overvoltage, which has been preset upon the shipment of a product (the estimated line of the activation voltage which has been preset through experiments, etc). After determining the voltage drop ΔV (=Ve-Ve') corresponding to the change in the electromotive voltage utilizing such estimated lines of the activation overvoltage, the estimated I-V characteristics line creation section (fourth detection unit) 83 creates the estimated I-V characteristics line as shown in FIG. 9. In FIG. 9, the solid line shows the estimated I-V characteristics line, the alternate long and short dash line shows the estimated line of the activation overvoltage, and the alternate long and two short dashes line shows the estimated line of the voltage drop caused by the direct-current resistance. Now, I-V characteristics estimation processing performed by the control apparatus 80 will be described below with reference to FIG. 10.

A-2. Explanation of Operation

The impedance measurement section 81 of the control apparatus 80 intermittently measures the impedance of the fuel cell 40 during the operation of the system. The impedance measurement section 81 employs the real part of the measured impedance as an estimated direct-current resistance value Re, multiplies this estimated direct-current resistance value Re by the FC current detected by the current sensor 150, and thereby determines the voltage drop caused by the direct-current resistance (step S100 to step S200). The impedance measurement section 81 then notifies the air stoichiometry judgment section 82 in the control apparatus 80 of the thus-determined voltage drop caused by the direct-current resistance.

Upon the reception of the notification containing the voltage drop caused by the direct-current resistance, the air stoichiometry judgment section 82 judges whether or not the air stoichiometry ratio is 1 or higher at the present moment by detecting the amount of the oxidant gas supplied to the fuel cell 40 (the amount of gas supplied per unit time) (step S300), and then notifies the estimated I-V characteristics line creation section 83 in the control apparatus 80 of the judgment result. Here, the air stoichiometry ratio is used to identify the operation state of the fuel cell 40, where the air stoichiometry judgment section 82 determines that the operation state is the normal operation state when the air stoichiometry ratio has been set to 1 or higher, while the air stoichiometry judgment section 82 determines that the operation state is the refresh operation state when the air stoichiometry ratio has been set to below 1.

The estimated I-V characteristics line creation section 83 determines a voltage drop component excluding the voltage drop caused by the direct-current resistant (hereinafter referred to as the "remaining voltage drop component") based on the air stoichiometry ratio notified by the air stoichiometry judgment section 82. In other words, the estimated I-V characteristics line creation section (judgment unit) 83 determines whether the voltage drop component, excluding the voltage drop caused by the direct-current resistance from the difference between the electromotive voltage of the fuel cell and the actual operating point (Ifc1, Vfc1), entirely consists of the activation overvoltage (the amount of voltage reduction caused by polarization) or includes the combination of the activation overvoltage and the voltage drop corresponding to the change in the electromotive voltage (the amount of reduction in the electromotive voltage).

Specifically, the estimated I-V characteristics line creation section 83 first obtains the actual operating point (Ifc1, Vfc1) of the fuel cell 40 at the present moment (FIG. 7). The estimated I-V characteristics line creation section 83 determines that the remaining voltage component entirely consists of the activation voltage when the air stoichiometry ratio notified by the air stoichiometry judgment section 82 is 1 or higher (step S400), creates the estimated I-V characteristics line as shown in FIG. 8 (step S500), and ends the processing.

On the other hand, the estimated I-V characteristics line creation section 83 determines that the remaining voltage drop component includes the combination of the activation overvoltage and the voltage drop caused by the change in the electromotive voltage when the notified air stoichiometry ratio is below 1 (step S450). In this step, when the estimated line of the activation overvoltage has already been created as described above (see FIG. 8), the estimated I-V characteristics line creation section 83 utilizes the created estimated line of the activation overvoltage, while when an estimated line of the activation overvoltage has not been created yet, the estimated I-V characteristics line creation section 83 utilizes an estimated line of the activation overvoltage, which has been preset upon the shipment of a product (the estimated line of the activation voltage which has been preset through experiments, etc.). After determining the voltage drop ΔV (=Ve-Ve') corresponding to the change in the electromotive voltage utilizing such estimated lines of the activation overvoltage, the estimated I-V characteristics line creation section 83 creates the estimated I-V characteristics line as shown in FIG. 9 (step S500), and ends the processing.

As described above, in this embodiment, the voltage drop which occurs as a result of the operation is categorized into three types: (1) a voltage drop caused by polarization and not proportional to the current; (2) a voltage drop proportional to the current (voltage drop caused by the direct-current resistance); and (3) a voltage drop corresponding to the change in the electromotive voltage, and the I-V characteristics of the fuel cell are estimated based on these types of voltage drops. Consequently, the I-V characteristics of the fuel cell can be estimated with higher accuracy as compared to related art, thereby minimizing the divergence between the actual I-V characteristics of the fuel cell and the estimated I-V characteristics line.

B. Applications

Application 1

Figure 11:
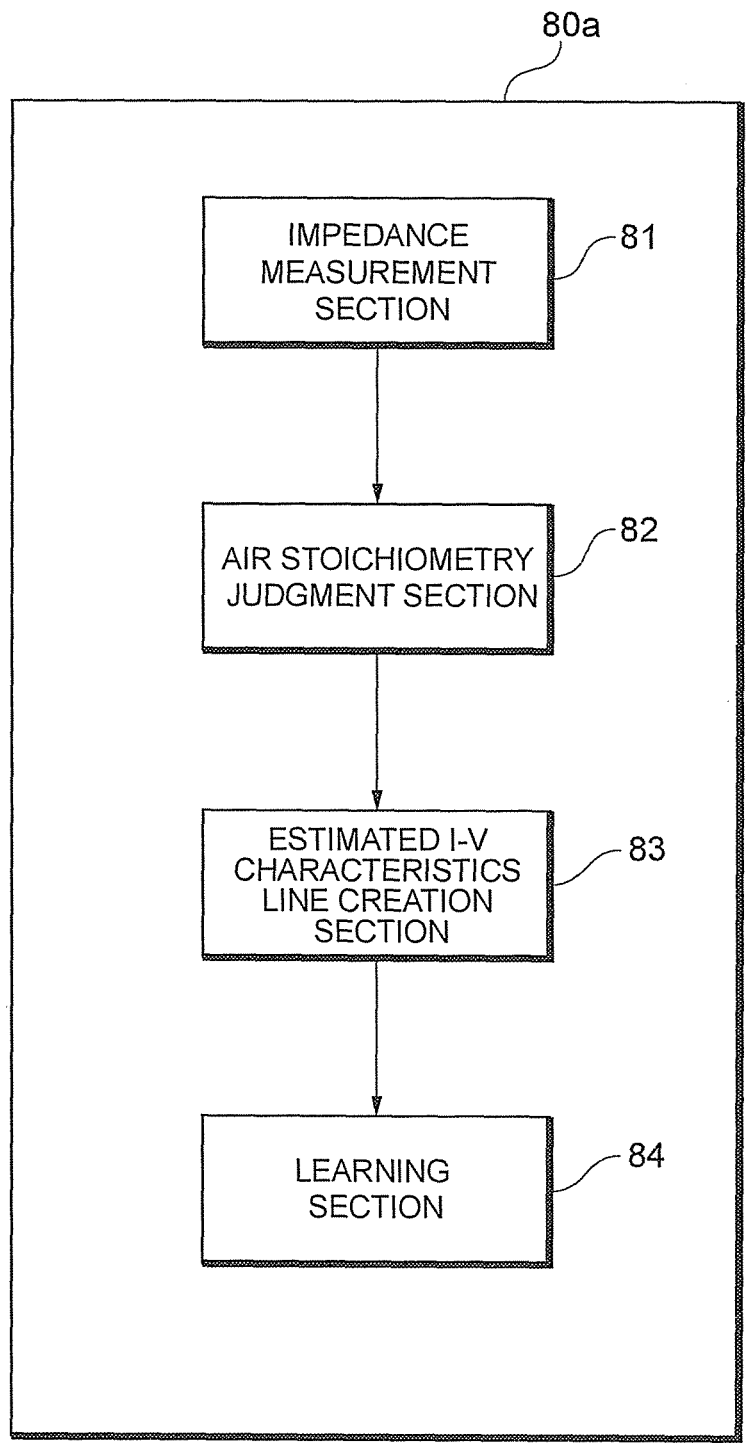
FIG. 11 is a functional block diagram related to an I-V characteristics estimation function according to application 1.
Figure 12:
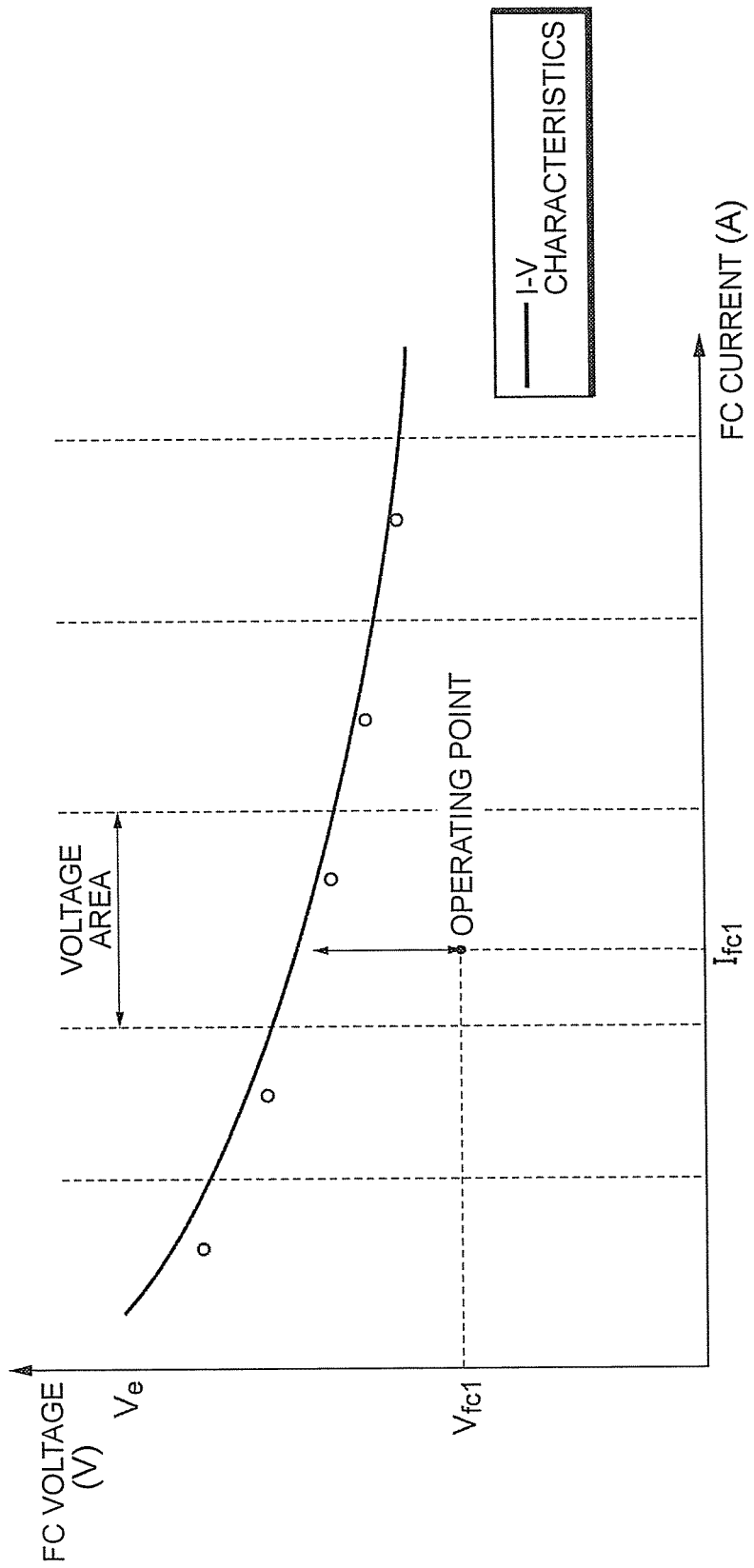
FIG. 12 is a diagram explaining a process of estimating I-V characteristics according to application 2.
Figure 13:
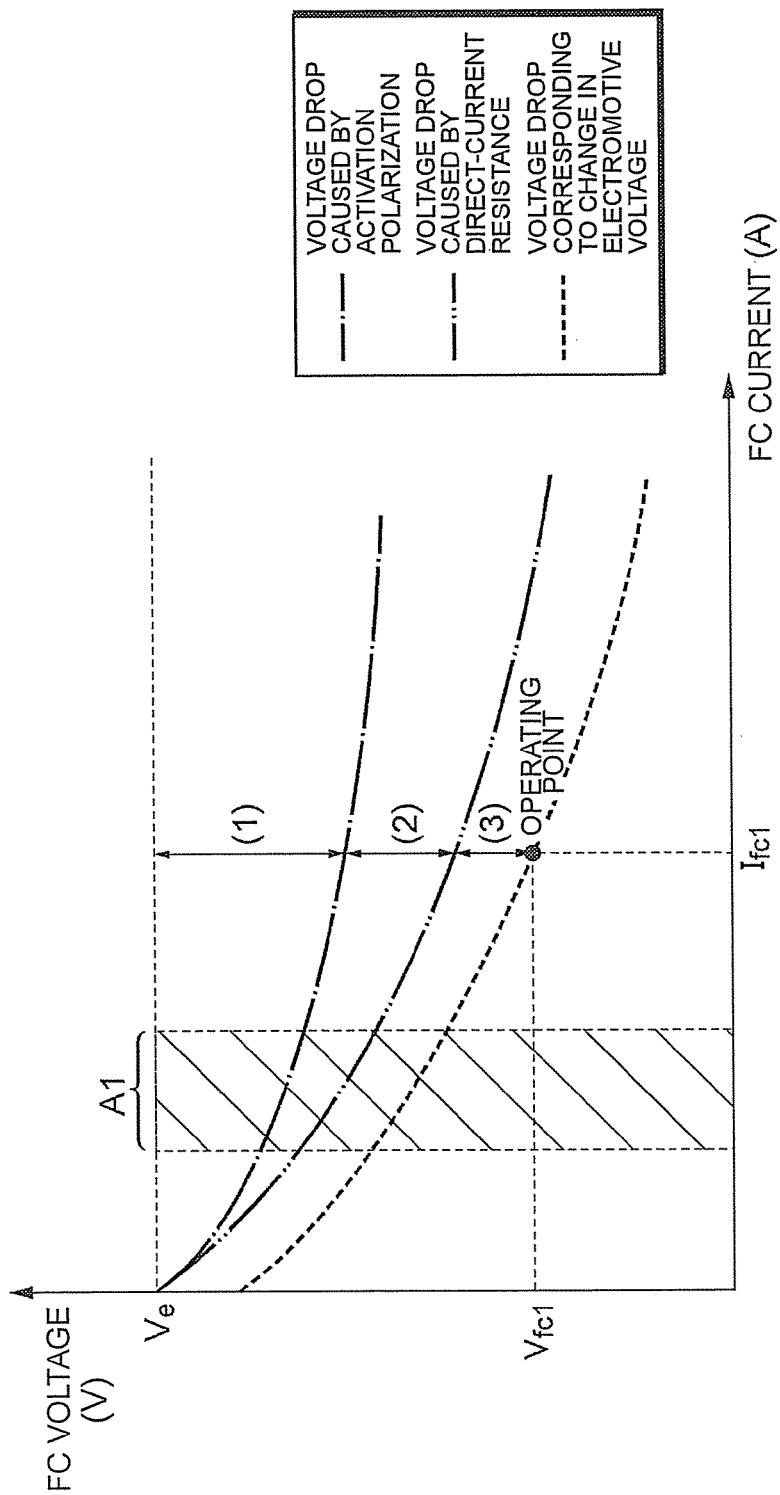
FIG. 13 is a diagram explaining the relationship between the degradation of a catalyst and activation overvoltage in a fuel cell.

FIG. 11 is a functional block diagram related to an I-V characteristics estimation function of a control apparatus 80a according to application 1.

The control apparatus 80a is the same as the control apparatus 80 shown in FIG. 5, except that a learning section 84 is additionally provided. Accordingly, corresponding reference numerals are assigned to corresponding parts and a detailed description thereof will be omitted.

The learning section (correction unit) 84 obtains the difference between the estimated I-V characteristics line created by the estimated I-V characteristics line creation section 83 and an actual operating point at the present moment, and feeds back the obtained difference (i.e., voltage deviation) to an activation overvoltage in a voltage area to which the actual operating point belongs. Specifically, the learning section 84 obtains the difference between the actual operating point (Ifc1, Vfc1) at the present moment and the estimated I-V characteristics line, and corrects the current area (hereinafter abbreviated as the "area") to which the actual operating point belongs based on the obtained difference, and corrects the estimated line of the activation overvoltage. Note that application 1 has provided an example of the activation overvoltage (voltage drop caused by the activation polarization) as a voltage drop caused by the polarization and not proportional to the current, and described the case where the activation overvoltage is feedback-controlled. However, in addition to (or instead of) the activation overvoltage, a concentration overvoltage may be feedback-controlled. The same applies to the applications described below.

Application 2

Whether the fuel cell 40 has been degraded or not may be determined by detecting the voltage drop caused by the polarization and not proportional to the current. More specifically, when detecting the voltage drop caused by the polarization and not proportional to the current, the control apparatus (judgment unit) 80 first compares the amount of detected voltage drop and a stack degradation judgment reference value (the amount of reduction in the electromotive voltage) stored in a memory (not shown). Note that, for the stack degradation judgment reference value, a value which has been determined in advance through experiments may be used. The control apparatus (judgment unit) 80 determines that the catalyst activation of the fuel cell 40 has decreased (i.e., the catalyst has been degraded) when the amount of detected voltage drop exceeds the stack degradation judgment reference value, and makes a control to notify the outside of the system, etc., of a message prompting the refresh control or the replacement of the fuel cell 40.

There exists a current area where, among the voltage drop caused by the polarization and not proportional to the current, especially the activation overvoltage greatly varies when the catalyst activation of the fuel cell 40 decreases (see the shaded part in FIG. 1). Accordingly, by detecting the amount of voltage drop in this current area A1, whether or not the catalyst activation of the fuel cell 40 has been degraded may be determined. Specifically, the control apparatus 80 detects the amount of voltage drop in the current area A1, and judges whether or not the amount of detected voltage drop exceeds the stack degradation judgment reference value. If the amount of detected voltage drop exceeds the stack degradation judgment reference value, the control apparatus 80 determines that the catalyst activation of the fuel cell 40 has been degraded, and makes a control to notify the outside of the system, etc., of a message prompting the refresh control or the replacement of the fuel cell 40. With such a configuration, whether or not the fuel cell 40 has been degraded can be determined rapidly or accurately.

Application 3

Although the example where the activation overvoltage is feedback-controlled has been described above, a current area, where the feedback control has not been performed at all after an ignition key was turned on, may exist under a certain operation condition of the fuel cell 40.

In application 3, a feedback amount in the current area where the feedback control has already been performed (corrected current area) is reflected in the current area where the feedback control has never been performed (uncorrected current area). For example, in the situation shown in FIG. 14, where the feedback control has never been performed for the current area A1 and the feedback control has been performed for the current area An as of the present moment (feedback amount Vn; correction amount), the control apparatus 80 estimates an activation overvoltage in the current area An-2 by, for example, adding the feedback amount Vn as of the present moment to the voltage value in the current area An-2. With such a configuration, even I-V characteristics for an unused current area can also be estimated, and thus efficient learning can be realized. In theory, the situation where the voltage value in each current area becomes higher than voltage values in lower current areas never happens. Accordingly, in order to prevent such a situation in a feedback control, a certain rule of the feedback control (e.g., inflection point will not exist) can be set in advance.

Application 4

Figure 14:
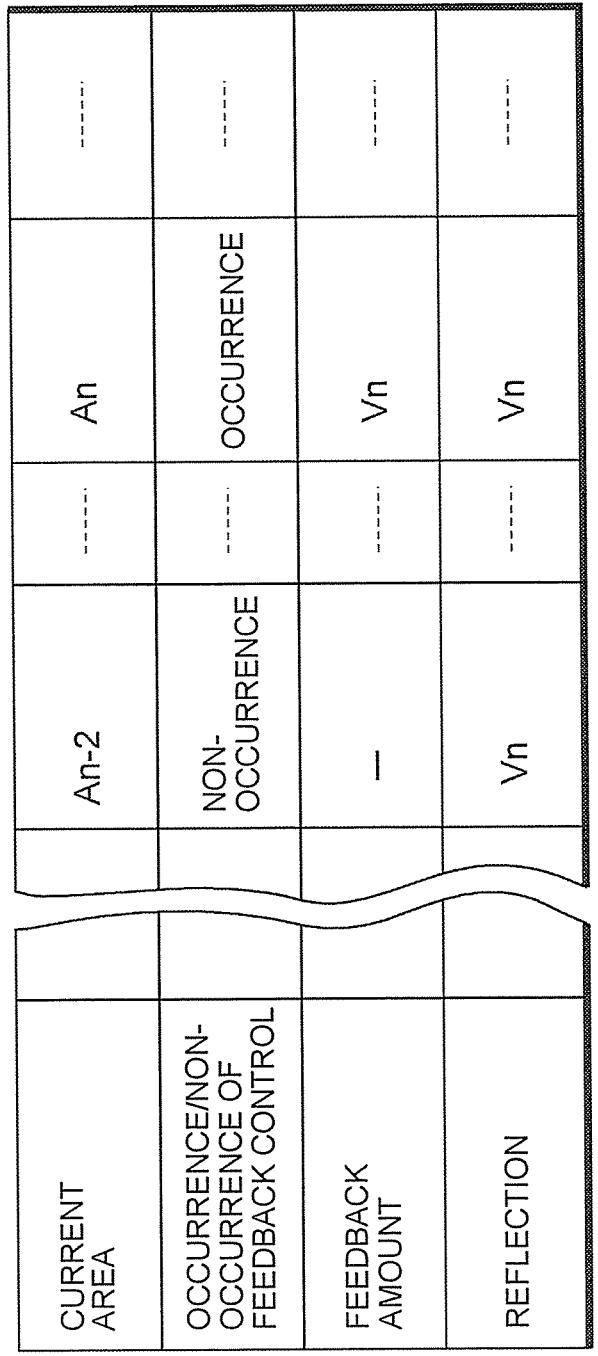
FIG. 14 is a diagram explaining a feedback control for activation overvoltage according to application 3.

When the activation overvoltage is feedback-controlled, the control apparatus (estimation unit) 80 may estimate the I-V characteristics of the fuel cell 40 individually for the I-V characteristics that vary with the increase of the current and for the I-V characteristics that vary with the decrease of the current. FIG. 14 is a diagram showing the relationship between the direction of variation of a current and the I-V characteristics, where the thick solid line shows the I-V characteristics varying with the increase of the current, while the thin solid line shows the I-V characteristics varying with the decrease of the current. As shown in FIG. 14, the hysteresis differs between the I-V characteristics varying with the increase of the current and the I-V characteristics varying with the decrease of the current. The control apparatus 80 detects the direction of variation of the output current (increasing or decreasing) of the fuel cell 40 and estimates the I-V characteristics corresponding to the detected direction of variation. In addition, in application 4, the absolute value of the amount of variation of the current is detected, where the feedback control for the activation overvoltage is performed when the absolute value is below a preset threshold value, while two types of I-V characteristics are used for a power control of the system without performing the feedback control for the activation overvoltage when the absolute value is equal to or higher than the threshold value.

Figure 15:
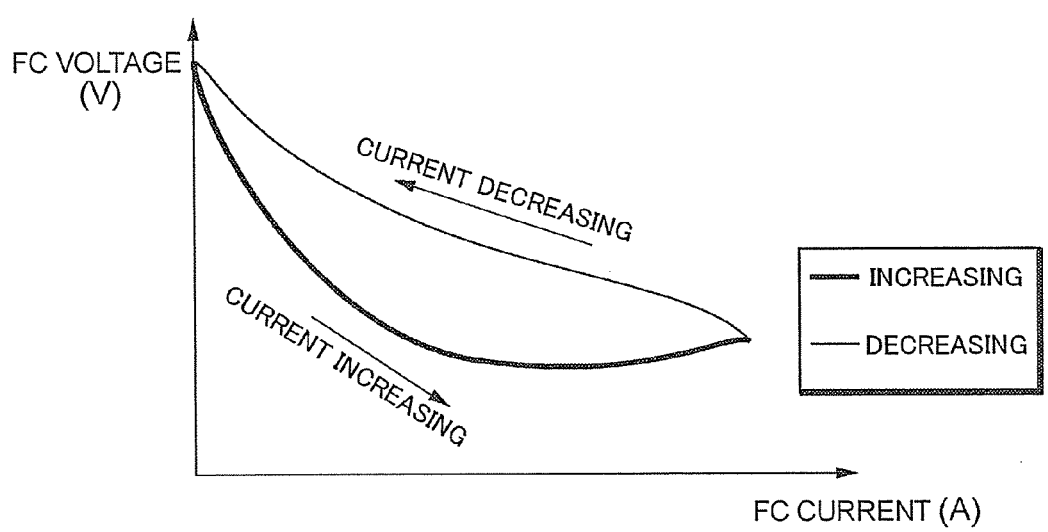
FIG. 15 is a diagram showing an example of the relationship between the direction of variation of a current and I-V characteristics according to application 4.

(1) When the Absolute Value of the Amount of Variation of Current is Below a Threshold Value The control apparatus 80 first judges whether the amount of variation of the current is a positive value or a negative value. When determining that the amount of variation of the current is a positive value, the control apparatus 80 performs the feedback control for the activation overvoltage on the basis of the I-V characteristics with the increasing current (the thick solid line in FIG. 15). On the other hand, when determining that the amount of variation of the current is a negative value, the control apparatus 80 performs the feedback control for the activation overvoltage on the basis of the I-V characteristics with the decreasing current (the thin solid line in FIG. 15).

(2) When the Absolute Value of the Amount of Variation of the Current is Equal to or Higher than a Threshold Value Similarly, the control apparatus 80 first judges whether the amount of variation of the current is a positive value or a negative value. When determining that the amount of variation of the current is a positive value, the control apparatus 80 performs the power control for the system using the I-V characteristics with the increasing current (the thick solid line in FIG. 15) without performing the feedback control for the activation overvoltage. On the other hand, when determining that the amount of variation of the current is a negative value, the control apparatus 80 performs the power control for the system using the I-V characteristics with the decreasing current (the thin solid line in FIG. 15) without performing the feedback control for the activation overvoltage. With such a configuration, the accuracy of estimation of the I-V characteristics can be enhanced.

What is claimed is:

1. A fuel cell system, comprising:
   a fuel cell;
   a first detection unit that is configured to detect an output current and an output voltage at an actual operating point in the fuel cell;
   a second detection unit that is configured to measure an impedance of the fuel cell and to measure an amount of voltage reduction caused by a resistance in the fuel cell based on the measurement result of the impedance and the output current;
   a third detection unit that is configured to detect an amount of voltage reduction caused by a polarization in the fuel cell;
   a fourth detection unit that is configured to detect an amount of reduction in an electromotive voltage of the fuel cell;
   an estimation unit that is configured to estimate current-voltage characteristics of the fuel cell based on a detection result by each of the detection units;
   a stoichiometry ratio detection unit that is configured to detect a stoichiometry ratio of an oxidant gas supplied to the fuel cell;
   a judgment unit that is configured to judge whether an amount of remaining voltage reduction, excluding the amount of voltage reduction caused by the resistance from the difference between the electromotive voltage of the fuel cell and the output voltage at the actual operating point, consists entirely of the amount of voltage reduction caused by the polarization or includes the combination of the amount of voltage reduction caused by the polarization and the amount of reduction in the electromotive voltage, based on the detected stoichiometry ratio of the oxidant gas; and
   an output section comprised of the estimation unit and the judgment unit configured to output current-voltage characteristics of the of the fuel cell and a judgment from the judgment unit;
   wherein the third detection unit is configured to detect the amount of voltage reduction caused by the polarization based on the amount of remaining voltage reduction when the amount of remaining voltage is determined as consisting entirely of the amount of voltage reduction caused by the polarization; and
   wherein the fourth detection unit is configured to detect the amount of reduction in the electromotive voltage based on the amount of remaining voltage reduction when the amount of remaining voltage reduction is determined as including the combination of the amount of voltage reduction caused by the polarization and the amount of reduction in the electromotive voltage and based on the detected amount of voltage reduction caused by the polarization.

2. The fuel cell system according to claim 1, wherein:
   the voltage reduction caused by the polarization includes an activation overvoltage; and
   the fuel cell system further comprises a correction unit that is configured to detect, for each predetermined current area, a voltage deviation generated between the current-voltage characteristics of the fuel cell estimated by the estimation unit and the output voltage at the actual operating point detected by the first detection unit, and to correct at least the activation overvoltage based on the detected voltage deviation.

3. The fuel cell system according to claim 2, wherein, assuming that a current area in which the correction has been performed from when the system was started until the present moment is referred to as a corrected current area, while a current area in which the correction has not been performed yet is referred to as an uncorrected current area, the correction unit is configured to correct the activation overvoltage in the uncorrected current area using a correction amount for the activation overvoltage in the corrected current area.

4. The fuel cell system according to claim 2, wherein:
   the estimation unit is configured to estimate different current-voltage characteristics depending on directions of variation of the output current of the fuel cell; and
   the correction unit is configured to correct the activation overvoltage using the current-voltage characteristics corresponding to the directions of variation.

5. The fuel cell system according to claim 1,
   wherein the judgment unit is further configured to judge whether or not a catalyst in the fuel cell has been degraded by comparing the amount of voltage reduction caused by the polarization and detected by the third detection unit with a set amount of reduction in the electromotive voltage.

* * * * *

UNITED STATES PATENT AND TRADEMARK OFFICE
CERTIFICATE OF CORRECTION

PATENT NO. : 8,530,105 B2
APPLICATION NO. : 12/600724
DATED : September 10, 2013
INVENTOR(S) : Kota Manabe et al.

Page 1 of 1

It is certified that error appears in the above-identified patent and that said Letters Patent is hereby corrected as shown below:

In the Claims

Column 11, line 45, please change "of the of the fuel" to -- of the fuel --.

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO. : 8,530,105 B2
APPLICATION NO. : 12/600724
DATED : September 10, 2013
INVENTOR(S) : Manabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Fifteenth Day of September, 2015

Michelle K. Lee
*Director of the United States Patent and Trademark Office*